(12) United States Patent
Drwal

(10) Patent No.: US 10,116,252 B2
(45) Date of Patent: Oct. 30, 2018

(54) METHOD AND APPARATUS FOR EFFICIENT SOLAR POWER COLLECTION

(71) Applicant: Robert S. Drwal, South Barrington, IL (US)

(72) Inventor: Robert S. Drwal, South Barrington, IL (US)

(*) Notice: Subject to any disclaimer, the term of this patent is extended or adjusted under 35 U.S.C. 154(b) by 42 days.

(21) Appl. No.: 15/337,619

(22) Filed: Oct. 28, 2016

(65) Prior Publication Data

US 2017/0126175 A1 May 4, 2017

Related U.S. Application Data

(60) Provisional application No. 62/248,382, filed on Oct. 30, 2015.

(51) Int. Cl.
| | | |
|---|---|---|
| *H02S 20/30* | (2014.01) | |
| *F24J 2/54* | (2006.01) | |
| *G01S 3/78* | (2006.01) | |
| *F24J 2/38* | (2014.01) | |
| *F24J 2/00* | (2014.01) | |

(52) U.S. Cl.
CPC ............... *H02S 20/30* (2014.12); *F24J 2/541* (2013.01); *G01S 3/78* (2013.01); *F24J 2/38* (2013.01); *F24J 2002/0084* (2013.01); *Y02E 10/47* (2013.01)

(58) Field of Classification Search
CPC ..... H02S 20/30; F24J 2/541; F24J 2/38; F24J 2002/0084; G01S 3/78
See application file for complete search history.

(56) References Cited

U.S. PATENT DOCUMENTS

2007/0227579 A1* 10/2007 Buller ............... H01L 31/03528
136/244

FOREIGN PATENT DOCUMENTS

WO WO-2015135019 A1 * 9/2015 ............. F24J 2/5427

* cited by examiner

*Primary Examiner* — Matthew T Martin
(74) *Attorney, Agent, or Firm* — Pauley Erickson & Kottis

(57) ABSTRACT

A method of seasonally positioning a solar panel to improve energy capture and/or reduce space needed for multiple panel installations. The solar panel is maintained in a fixed horizontal position during a first period of time, such as including summer months, and then follows a tracking procedure during a second period of time, such as including winter months.

18 Claims, 4 Drawing Sheets

METHOD AND APPARATUS FOR EFFICIENT SOLAR POWER COLLECTION

CROSS REFERENCE TO RELATED APPLICATION

This application claims the benefit of U.S. Provisional Patent Application Ser. No. 62/248,382, filed on 30 Oct. 2015. The Provisional Application is hereby incorporated by reference herein in its entirety and is made a part hereof, including but not limited to those portions which specifically appear hereinafter.

FIELD OF THE INVENTION

This invention relates generally to solar power and, more particularly, to a method and apparatus for improving energy collection/production efficiency of solar panel systems.

BACKGROUND OF THE INVENTION

Existing solar panel mounting techniques include fixed panel elevation set at local latitude; this is a common technique. Another solar collection technique is to track local noon solar elevation, which generally provides marginal efficiency improvement over a fixed system in higher latitudes, but for a higher cost. A third technique is to track the azimuth to align with daily solar movement, and also track annual seasonal solar elevation. This is likely the most efficient method, but generally prohibitively expensive, and uses excessive land area. There is a continuing need for improved techniques for solar power collection.

SUMMARY OF THE INVENTION

A general object of the invention is to provide significant energy efficiency improvement through an innovative tracking method and/or low cost mechanization.

The invention includes a method of seasonally positioning a solar panel. In embodiments of this invention, the method includes maintaining the solar panel in a horizontal position for a predetermined number of days of a year, and positioning the solar panel in at least one angled position at an angle to the horizontal position for a remaining number of days of the year. In embodiments of this invention, the method includes positioning the solar panel in a fixed horizontal position during summer months and tracking, for example, a plurality of local seasonal noon solar elevations, during winter months.

The invention further includes a method of seasonally positioning a solar panel that includes maintaining the solar panel in a horizontal position for a predetermined number of days of a year that overlap the summer solstice, and positioning the solar panel in at least two angled positions each at an angle to the horizontal position during a remaining number of days of the year. The predetermined number of days in the horizontal position is desirably between, or includes the days between, the spring equinox and the autumn equinox.

Embodiments of this invention include a method referred to herein as Horizontal Elevation And seasonal Tracking ("HEAT"). The HEAT method of embodiments this invention, and accompanying implementation devices, can ultimately reduce costs by 20% or more when compared to a fixed mounting of equal energy, making the choice for alternative energy available to many more people much sooner, especially with commercial/industrial implementation.

In embodiments of this invention, solar panels track local seasonal noon solar elevation in winter only. The panel remains fixed horizontally, (parallel to ground) in the summer. The timing of transition (reset date) between the positioning locations can be dependent on local latitude. In embodiments of this invention, panel movement is accomplished manually, or with a high torque, low power, microprocessor controlled, geared motor operating a panel system that is balanced against wind and snow loading.

In embodiments of this invention discussed herein, panel efficiency is determined by calculating the cumulative annual direct sun hours based on local latitude from NOAA files. For reference purposes, the maximum annual direct sun hours possible at any latitude is 12×365.25=4,383 hours using 2 axis tracking, and is never practically achieved.

The efficiency improvements from the HEAT method of this invention are obtained from a combination of timed horizontal elevation and seasonal tracking that each taken alone cannot provide. Mechanically, it is very similar to seasonal tracking alone, except that in tropical latitudes little movement from 0 degree elevation is needed most of the year, while elevation adjustment beyond +/−23.5 degrees panel elevation is needed only above the tropics, and for longer stretches of time.

In embodiments of this invention, a practical average operating speed for HEAT panels is 1 degree/minute. At this rate, the operating time per day when tracking is 15 seconds, or much less, even zero near the winter solstice. In fact, with a HEAT system, the horizontal position is maintained for 3 to >10 months in the summer, depending on latitude, and could transition to or from tracking in 10 to 45 minutes. The operating time per day while tracking should vary to match the daily sun elevation change. The full elevation movement of a panel is no more than 75 degrees over a one year cycle, and only occurs at very high latitudes. If the panels can be mounted to a support structure in a balanced fashion, such as on a horizontal surface or ground mounting, actuation loads are kept low. Thus, the power to operate the system over an entire year is very low, such as <5 watts per operation, corresponding to <4 watt-hours of energy per year, when combined with the total annual movement. Also, not only is structural loading from winter snow greatly diminished because of the higher panel elevation, snow is less likely to block sunlight as the panel is nearer vertical at the time. Balanced wind loads on near vertical panels further aid snow removal without loading the dynamic tracking elements. HEAT panels can be as closely spaced as fixed panels without shadow interference from each other, providing an effective use of real estate.

Control of HEAT panels can also be made simple by using an inexpensive, load capable geared motor drive with a microprocessor, programmed to match predictable solar movement over the course of the year. To keep the panels from drifting beyond predetermined limits, and for calibration purposes, a closed loop position servo back up should be used. With the total movement of the system limited to 75 degrees or less per year, the wear and tear on moving parts is low and therefore kept very reliable. In fact, the greatest movement only occurs twice per year, when transitioning between horizontal elevation and seasonal tracking. Since seasonal elevation adjustment is most rapid near the equinoxes, it is possible to limit the motion to 1 operation of ~1.5 deg. every 6 days near that time, with even less frequent movement near the winter solstice. As little as 2 manual operations per year are possible at any latitude with little compromise in alignment efficiency over daily movement operation.

DESCRIPTION OF THE INVENTION

Figure 1:
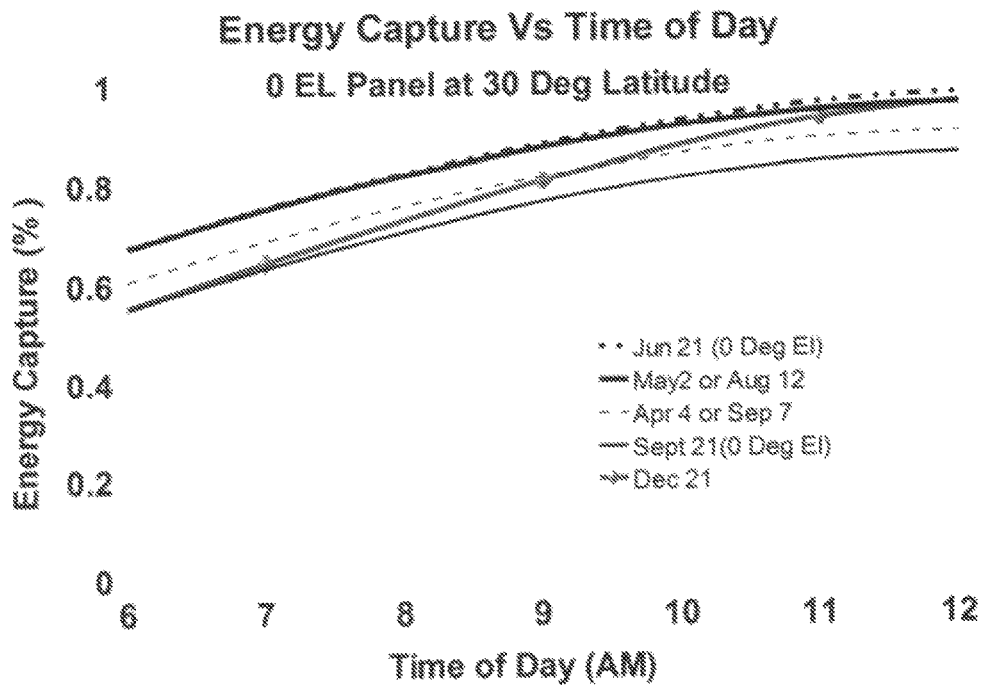
FIG. 1 is a graph of energy capture versus time of day of a solar panel according to one embodiment of this invention at 30 degrees latitude.
Figure 2:
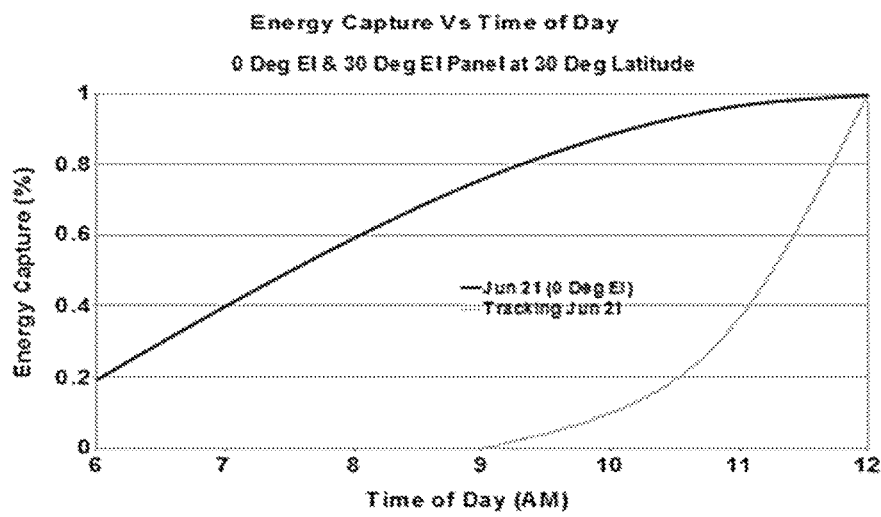
FIG. 2 is a graph of energy capture comparison versus time of day of solar panel positions at 30 degrees latitude at summer solstice.
Figure 3:
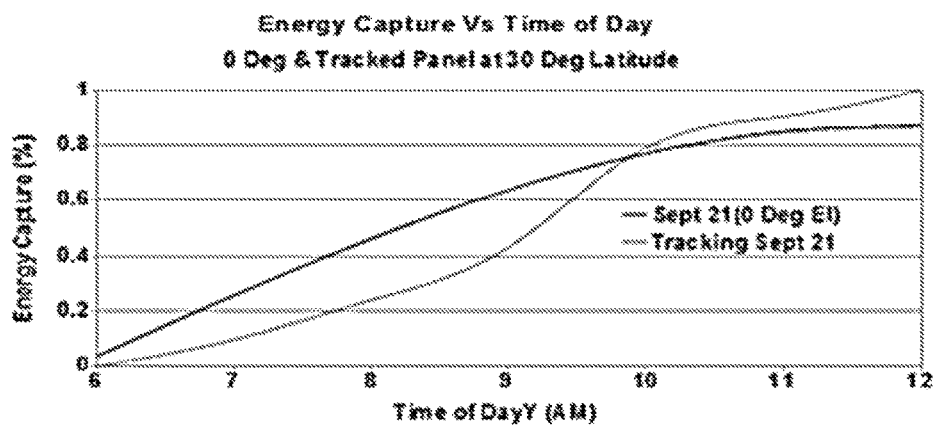
FIG. 3 is a graph of energy capture comparison versus time of day of solar panel positions at 30 degrees latitude at equinox.

Solar panel efficiency can be a significant driver for an individual evaluating the cost of installing clean energy alternatives. While solar panel efficiency has improved over the years, it has become more difficult to improve further. Most applications that have found the present state of the art acceptable use optimally oriented fixed mounted roof panels, and are in lower latitudes. Improvement in system efficiency by tracking the sun all through the day has not been practical because of cost, spacing to avoid shadows, and mounting complexity. Another simpler tracking alternative that has shown modest efficiency improvements over fixed systems, is seasonal tracking. This method is where one panel axis is fixed to face in a direction toward the equator, but where the panels are slowly elevated or lowered on another axis to match the changing noontime solar elevation during the year. Although this method does collect more solar energy, without added spacing to avoid shadows, it is also not justified due to the added cost and complexity of the system from the modest improvement in only higher latitudes. Furthermore, this method as customarily used, does not exploit the full potential of the higher latitude summer season.

The equator receives the most energy from the sun on an annual basis from a fixed system. There, solar panels can be fixed in a horizontal position the entire day and year for the most benefit. During the summer season in higher latitudes, a similar opportunity to collect as much or even more energy as the equator can be had by keeping the panel elevation horizontal all through the day. While this is extremely effective at higher latitudes, it cannot be continued throughout the year. The greatly reduced solar elevation in the winter would be unacceptable for a horizontal panel, even without considering snow cover.

Embodiments of this invention include a method of seasonally positioning a solar panel. The method includes maintaining the solar panel in a horizontal position for a predetermined number of days of a year. The horizontal position is a position that is substantially parallel to a horizontal surface or a plane of a horizon, and otherwise facing upward with the surface of the panel perpendicular to the vertical, such as shown in phantom in FIG. 7. The method further includes positioning the solar panel in one or more angled positions at an angle to the horizontal position for a remaining number of days of the year.

The horizontal position is used during summer months, and can range from about 3 to about 10 months of the year in many latitudes moving away from the equator. In one embodiment of this invention, the predetermined number of days fixed in the horizontal position is between spring equinox and autumn equinox. The predetermined number of days fixed in the horizontal position is desirably a first number of days before the summer solstice and a second equal or different number of days after the summer solstice. In some embodiments, the predetermined number of days of a year comprises at least about 80 days, more preferably between about 80 and about 190 days, and desirably about 90 to about 120 days, depending on the latitude location of the panel.

Figure 7:
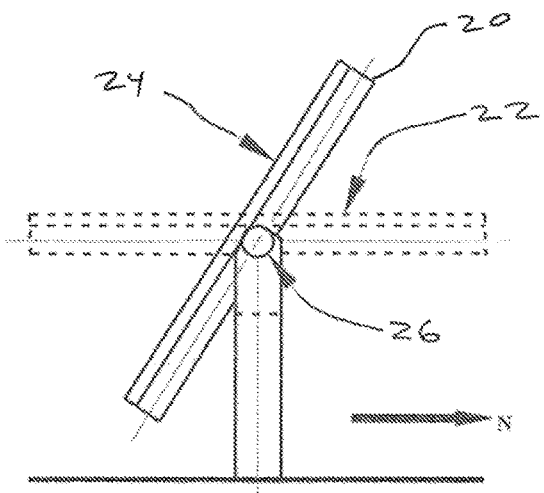
FIG. 7 shows a solar panel according to one embodiment of this invention.

During days and months when the sun is not as high in the sky, such as during winter months and early spring and late fall, depending on latitude, the solar panel is positioned at an angle to the horizontal position. As shown in FIG. 7, the solar panel can be titled, manually or motor-driven, to an angled position. Desirably, the solar panel is angled at least two different positions, and preferably a plurality of angled position, each at a different angle to the horizontal position, during the remaining non-horizontal days of the year. The solar panel can be manually or automatically moved between the different positions. The particular angles and when to transition between positions are a function of a latitude position of the solar panel. In one embodiment, the solar panel tracks seasonal noon solar elevation during some or all of the days in the non-horizontal positions.

The method of this invention includes seasonal tracking before and after the summer in higher latitudes. Combining stationary horizontal panel orientation with appropriately timed seasonal tracking provides a significant energy advantage. Even an appropriately timed single stationary winter mid tracking elevation adjustment provides much improved efficiency over a fixed system.

Efficiency comparisons depend on latitude and other factors, but when evaluated based on latitude only, can be informative. Comparing a fixed panel system that has the elevation set to its latitude location, with a HEAT system at the same location, a significant advantage for the HEAT system becomes apparent. Calculations are based on local latitude solar data from NOAA files.

| HEAT System Compared With Panels Fixed at Latitude ||||||||||||
| Lat. | Panel Elevation ||| Elevation Tracking ||| Panel at 0 Deg Elevation ||| Ave Annual Direct Sun Hours On Panels || Ratio |
| Deg | Deg | Deg | Deg | Date | Date | Days | Date | Date | Days | HEAT | Fixed | HEAT/Fixed |
|---|---|---|---|---|---|---|---|---|---|---|---|---|
| 50 | 0 | 50 | 73.5 | 12 Aug. | 2 May | 280 | 2 May | 12 Aug. | 85 | 2,985 | 2,634 | 1.13 |
| 40 | 0 | 40 | 63.5 | 16 Sep. | 25 Mar. | 189 | 25 Mar. | 16 Sep. | 176 | 3,077 | 2,542 | 1.21 |
| 30 | 0 | 30 | 53.5 | 31 Oct. | 9 Feb. | 99 | 9 Feb. | 31 Oct. | 266 | 3,121 | 2,192 | 1.42 |
| 20 | 0 | 20 | 43.5 | 30 Nov. | 11 Jan. | 41 | 11 Jan. | 30 Nov. | 324 | 3,266 | 2,067 | 1.58 |
| 10 | 0 | 10 | 33.5 | 30 Nov. | 11 Jan. | 41 | 11 Jan. | 30 Nov. | 324 | 3,150 | 2,513 | 1.25 |
| 0 | 0 | 0 | 23.5 | 30 Nov. | 11 Jan. | 41 | 11 Jan. | 30 Nov. | 324 | 3,026 | 2,954 | 1.02 |
|  | HEAT | Fixed | HEAT |  |  |  |  |  | Ave-> | 3,104 | 2,484 | 1.27 |

This unexpected advantage for the HEAT approach can be explained with the graphs of FIGS. 1-4. When the panels are kept horizontal in summertime higher latitudes, there is a small compromise in energy collection efficiency near the noon hour because the panel elevation is slightly lower than optimum. But the advantage is quickly regained in the remaining hours of longer summer days because only the sun elevation, not its azimuth, affects the solar angle with a horizontal panel and is never in its own shadow. This mimics the panel elevation at the equator. On the other hand, when a panel elevation matching solar noon elevation is collecting as much as a horizontal panel the entire day, it signals the time to start seasonal tracking, as fall or winter approaches. Similar reasoning triggers the timing to return to a horizontal elevation in the approaching spring or summer. In winter, the much reduced solar azimuth change coupled with low daily sun elevation is better exploited on a highly inclined panel that completely avoids its own shadow. The higher panel angle also helps reduce obstruction from snow that will tend to fall off.

Figure 4:
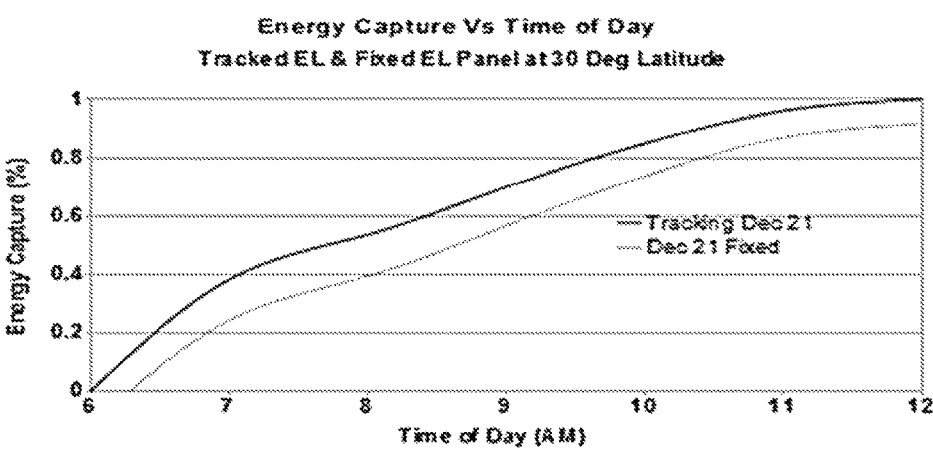
FIG. 4 is a graph of energy capture comparison versus time of day of solar panel positions at 30 degrees latitude at winter solstice.
Figure 5:
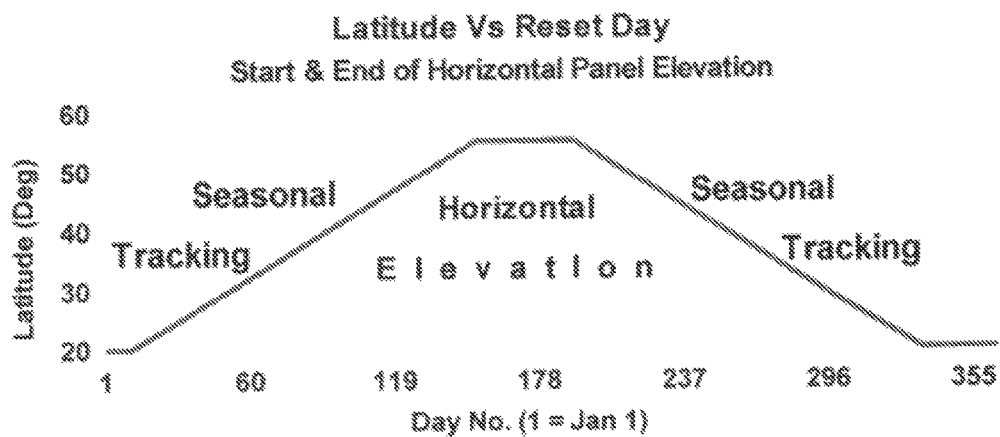
FIG. 5 is a representative summary of transition dates for positioning solar panels according to one embodiment of this invention.
Figure 6:
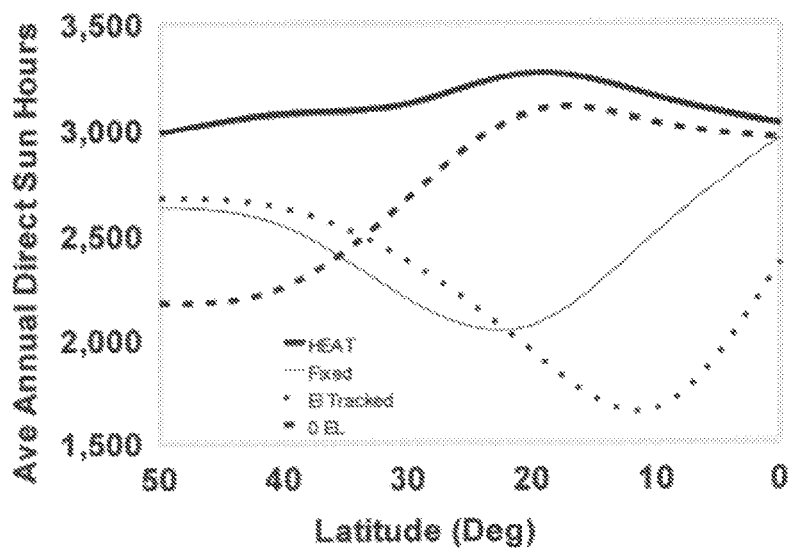
FIG. 6 shows direct sun hours for different panel positions at different latitudes.

It is evident in FIG. 1 that there is little hourly change in the energy capture from season to season with a HEAT system at 30 degrees latitude. From mirror symmetry, the same energy capture is available from noon to 6 PM. Similar results are found at other latitudes. As shown between FIGS. 2 and 3, summertime energy capture falls off precipitously for tracking panels shortly before and after noon, when compared with panels at horizontal elevation. A crossover between tracked and horizontally elevated panels appears near the equinox at 30 deg. latitude, becoming nearly equal on a daily basis by, for example, October 31 or February 9, signaling the need to transition. As shown in FIG. 4, the wintertime tracking energy advantage over panels fixed at latitude is clear. FIG. 5 illustrates a panel angle elevation summary according to one embodiment of this invention.

The benefit of horizontally elevated panel exposure time increases as latitude decreases, and the maximum time occurs at the equator where it could remain horizontal all through the year. Any seasonal tracking time at the equator is productive for only a few winter weeks. As latitude increases, however, maintaining horizontal elevation for all but the winter season provides the most energy capture. Movement away from the equator provides opportunity for efficiency improvements by introducing more seasonal tracking time during the lengthening winter. As represented in FIG. 5, the extreme situation is continuous seasonal tracking throughout the year in latitudes above 55 degrees.

The timing of the transition between horizontal panel elevation and seasonal tracking varies with latitude. The above reset date schedule for latitude does not consider local weather patterns that must also be evaluated regionally and locally. Horizontal elevations all year in the tropics approach HEAT system energy collection.

The efficiency improvements from the HEAT methods of this invention are from a combination of timed horizontal elevation and seasonal tracking that each taken alone cannot provide. Mechanically, it is very similar to seasonal tracking alone, except that in tropical latitudes little movement from 0 degree elevation is needed most of the year, while elevation tracking movement beyond +/−23.5 degrees panel elevation is needed only above the tropics, and for longer stretches of time.

A practical average operating speed for HEAT panels is 1 degree/minute. At this rate, the operating time per day when tracking is 15 seconds, or much less, even zero near the winter solstice. In fact, with a HEAT system, the horizontal position is maintained for 3 to 10 (or more near equator) months in the summer, depending on latitude, and could transition to or from tracking in 10 to 45 minutes. The operating time per day while tracking should vary to match the daily sun elevation change. The full elevation movement of a panel is no more than 75 degrees over a one year cycle, and only occurs at very high latitudes. If the panels can be mounted to a support structure in a balanced fashion, such as on a horizontal surface or ground mounting as shown in FIG. 7, actuation loads are kept low. Thus, the power to operate the system over an entire year is very low, <5 watts per operation, corresponding to <4 watt-hours of energy per year, when combined with the total annual movement. Also, not only is structural loading from winter snow greatly diminished because of the higher panel elevation, snow is less likely to block sunlight as the panel is nearer vertical at the time. Balanced wind loads on near-vertical panels further aid snow removal without loading the dynamic tracking elements.

Figure 8:
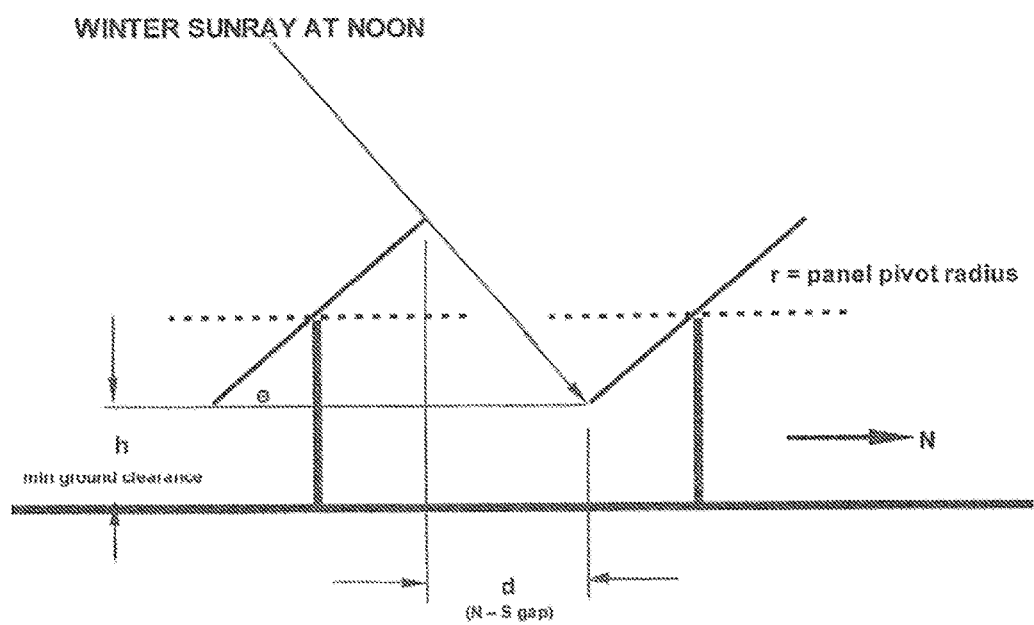
FIG. 8 illustrates spacing between two solar panels in the angled, "winter" position.

The HEAT approach of this invention will work very effectively on land, or even water if it is mounted on a stable platform such as an anchored barge. In embodiments of this invention, HEAT panels can be as closely spaced as fixed panels without shadow interference from each other, providing an effective use of real estate. To demonstrate this feature of the invention, FIG. 8 illustrates an angled winter positioning of two panels according to one embodiment of this invention, and the following table includes exemplary data and calculations to determine spacing of adjacent panels.

| HEAT Panel Spacing in N-S Direction w/o Noon Shadowing S Panel HEAT E-W Spacing Has No Gap ||||
| LAT DEG | EL LAT + 12 DEG | HEAT Area Used % | | Daily Tracking Area Used % |
|---|---|---|---|---|
| 10 | 22 | 86.7 | | 66.7 |
| 18 | 30 | 76.9 | ← Daily Tracking Min E-W Spacing | 59.1 |
| 20 | 32 | 74.1 | without E-W 30 deg Tilt Shadowing | 57.0 |

-continued

| 30 | 42 | 58.4 | 44.9 |
|---|---|---|---|
| 40 | 52 | 37.8 | 29.1 |
| 50 | 62 | 6.7 | 5.1 |

Simplified HEAT system requires only 2 positions
Summer position panels are horizontal
Winter position panels are at Elevation = latitude + 12 deg = mid tracking
Solar Panel Array Spacing % Land Area Vs Latitude
(Elevation = Latitude + 12 Deg in Winter Season)

$2r = (d + 2r \cos\Theta) \cos\Theta$, $k = \cos\Theta$, $\Theta$ max = Elevation = Latitude + 23.5 deg
$d = 2r (1/\cos\Theta - \cos\Theta) = 2r(1/k - k)$ = N-S gap to clear noon shadow at $\Theta$max
$d/(d + 2r \cos\Theta) = 1 - k^2 = \%$(N-S gap)
$1 - (1 - k^2) = k^2 = \%$ Total side length = % square area
(1 side of square = 3, no E-W gap)

The easiest placement of a HEAT system is on a horizontal surface, but can be adapted to sun facing terrain or angled roofs as well. With the improved efficiency, less land area is needed since fewer panels achieve the same energy output. With the savings from fewer panels, adding battery storage into the system provides an opportunity for day and night operation and less grid dependency. Commercial applications could see even more benefits of HEAT due to the economy of scale cost reduction from standardized hardware.

FIG. 7 illustrates a mounted solar panel 20 movable between a horizontal panel position 22 and an angled tracking position 24. The panel is connected to a frame or stand by a moveable joint mechanism 26, such as a rotational bearing or a manual or motorized geared or angular drive. To provide the most economic return for this approach requires a safe, reliable, low cost, moveable panel mount.

In embodiments of this invention, control of HEAT panels are made simple by using an inexpensive, load capable geared motor drive with a microprocessor, programmed to match predictable solar movement over the course of the year. To keep the panels from drifting beyond predetermined limits, and for calibration purposes, a closed loop position servo back up should be used. With the total movement of the system limited to 75 degrees or less per year, the wear and tear on moving parts is low and therefore kept very reliable. In fact, the greatest movement only occurs twice per year, when transitioning between horizontal elevation and seasonal tracking. Since seasonal elevation adjustment is most rapid near the equinoxes, it is possible to limit the motion to 1 operation of ~1.5 deg. every 6 days near that time, with even less frequent movement near the winter solstice. Thus, using this tactic, less than 30 operations per year is possible at any latitude with little compromise in alignment efficiency over daily movement operation. As little as 2 movements per year, between summer horizontal and winter mid tracking, is very useful.

The ultimate viability of a solar panel system rests on comparing the total installation cost to the time required to recover it from energy cost savings. Clearly, system efficiency plays a significant role here, and installation cost versus local grid energy cost all come into play. The present state of the art achieves acceptable investment benefits in tropical and subtropical latitudes with fixed systems, but is marginal at best for higher latitudes where most people live. An average efficiency improvement of 27% from HEAT opens up large population segments to this technique when the cost of the system is controlled, especially if local grid energy is expensive. Variations in local altitude and weather are not accounted for in the efficiency improvement, only latitude is. Individual conditions are too varied to make this evaluation, but must be accounted for when deciding on solar power installation also. While panel manufacturing costs are predicted to continue to decline in the future, there is no longer any need for many people to wait for this uncertain time frame and level of improvement. The return on investment threshold could be available to many right now with the efficiency bounty provided from an inexpensive HEAT system.

According to a study by Harvard grad student, Bill Rankin, roughly 88 percent of the world's population lives in the Northern Hemisphere, with about half north of 27 degrees north. Since most of the world population lives far from the equator, and is usually near water, there exists much opportunity for solar power if it is economically viable. Improving efficiently with affordable converted solar energy remains a huge challenge that could be assisted with the help of an inexpensive HEAT system.

As latitude increases, the range of sun exposure reduces in winter and increases in the summer. HEAT exploits this difference because when the winter sun is lowest and daylight is shortest, the sun is never far from due south, (in the northern hemisphere). HEAT panels are nearer vertical then, more easily shedding snow, and able to capture more direct sunlight.

In the summer, almost all latitudes can harvest even more early and late sun than conventional seasonal tracking, or fixed latitude elevation alone allows, especially if lower local segments of the northeastern and northwestern sky are relatively unobstructed (southeast and southwest in the southern hemisphere).

Obtaining improved solar energy efficiency with daily tracking alone has some advantage over fixed or seasonal tracking alone; however, daily tracking requires more installation surface area to avoid shadow overlapping from adjacent panels. This is also true for 2-axis tracking systems, with additional cost, complexity, and reduced reliability with both tracking. HEAT has efficiency improvement near tropical latitudes, and in higher latitudes where there is greater population density, and where real estate space is less available. A group of HEAT panels could be arranged continuously in an east-west line without fear of shadow interference. However, since population density rapidly declines above 60 degrees latitude, and winter sun above that level is very low, solar power is less practical there. HEAT is the best approach to affordable renewable energy from 10 to 55 degrees latitude north or south, where most people live.

Daily tracking that can achieve annual efficiency improvements around 30% have been shown, but with an added cost of 50% or more, and without accounting for less efficient space allocation. Large expansive areas are most suitable for this. A HEAT system can achieve significant annual efficiency improvements in most latitudes with an added cost of less than 2% over fixed panels of equal power. The cost is contained by using a single low power geared motor drive for coupled multiple panels, and the simplicity of the controls. Most of the efficiency gained over a fixed system is in the summer season, when it may be needed most, and energy demand is usually highest. There is also efficiency improvement during the winter season due to more direct mid-day sun on panels less covered with snow due to their nearer vertical elevation. There is no difference in efficiency near the equinoxes, because fixed panels are usually set at this optimum average elevation for all the year, while seasonal tracking passes through this position twice per year. HEAT also requires less land surface area than a fixed system of equal energy because fewer panels are needed and could be as closely spaced. Therefore, cost containment allows quicker recovery of the investment over time.

The HEAT method and implementation devices of this invention can ultimately reduce costs by 20% or more when compared to a fixed mounting of equal energy, making the choice for alternative energy available to many more people much sooner.

The invention illustratively disclosed herein suitably may be practiced in the absence of any element, part, step, component, or ingredient which is not specifically disclosed herein.

While in the foregoing detailed description this invention has been described in relation to certain preferred embodiments thereof, and many details have been set forth for purposes of illustration, it will be apparent to those skilled in the art that the invention is susceptible to additional embodiments and that certain of the details described herein can be varied considerably without departing from the basic principles of the invention.

What is claimed is:

1. A method of seasonally positioning a solar panel, comprising: providing a mounted solar panel moveable between a horizontal position and an angled tracking position, wherein the mounted solar panel is connected to a frame or stand by a moveable joint mechanism, wherein one panel axis is fixed to face in a direction toward the equator,
   maintaining the solar panel in a fixed and non-tracking horizontal position for a predetermined number of days of a year; and
   positioning the solar panel in at least one angled position at an angle to the horizontal position for a remaining number of days of the year, wherein the mounted solar panel is controlled electromechanically or manually, and the mounted solar panel is balanced against wind and snow loading, and the predetermined number of days comprises at least 80 days centered on the summer solstice.

2. The method according to claim 1, wherein the horizontal position is substantially parallel to a horizontal surface or a plane of a horizon.

3. The method according to claim 1, further comprising positioning the solar panel in two different positions each at a different angle to the horizontal position during the remaining number of days of the year.

4. The method according to claim 3 further comprising manually repositioning the solar panel between the horizontal position and the two different positions.

5. The method according to claim 1, further comprising tracking seasonal noon solar elevation during the remaining number of days of the year by positioning the solar panel in each of a plurality of angled position each at a different angle to the horizontal position during the remaining number of days of the year.

6. The method according to claim 5, wherein a timing of transition between the each of the plurality of angled positions is a function of a latitude position of the solar panel.

7. The method according to claim 1, further comprising the solar panel tracking seasonal noon solar elevation between a first angled position and a maximum angled position during a second predetermined number of days during the remaining number of days of the year, wherein the maximum angled position is predetermined by adding 23.5 degrees to a latitude coordinate value of a position of the solar panel.

8. A method of seasonally positioning a solar panel, comprising: providing a mounted solar panel moveable between a horizontal position and an angled tracking position, wherein the mounted solar panel is connected to a frame or stand by a moveable joint mechanism, wherein one panel axis is fixed to face in a direction toward the equator, wherein the panel movement is controlled electromechanically or manually, and the panel is balanced against wind and snow loading,
   maintaining the solar panel in a fixed and non-tracking horizontal position for a predetermined number of days of a year that overlap summer solstice, wherein the horizontal position is parallel to a horizontal surface or a plane of a horizon, and the predetermined number of days comprises at least 80 days centered on the summer solstice whereby a first number of the days are before the summer solstice and a second equal number of the days are after the summer solstice; and
   positioning the solar panel in at least two angled positions each at an angle to the horizontal position during a remaining number of days of the year, wherein a timing of transition to each of the at least two angled positions is a function of a latitude position of the solar panel.

9. The method according to claim 8, further comprising manually repositioning the solar panel between the horizontal position and the two different positions.

10. The method according to claim 8, further comprising positioning the solar panel in each of a plurality of angled positions each at a different angle to the horizontal position during the remaining number of days of the year.

11. The method according to claim 10, wherein a timing of transition between the each of the plurality of angled positions is a function of the latitude position of the solar panel.

12. The method according to claim 8, further comprising the solar panel tracking seasonal noon solar elevation during a second predetermined number of days during the remaining number of days of the year.

13. The method according to claim 8, further comprising:
   moving the solar panel to a first angled position at an end of the predetermined number of days; and
   tracking seasonal noon solar elevations during the remaining number of days of the year, wherein the tracking comprises a plurality of angled panel positions each at an angle to the horizontal position.

14. The method according to claim 13, wherein the tracking reaches a maximum angled position at winter solstice and then tracks back to the first angled position, and further comprising moving the solar panel from the first angled position back to the horizontal position for a second predetermined number of days of a second, subsequent year.

15. The method according to claim 14, wherein the maximum angled position is equal to a latitude degree of the solar panel plus 23.5 degrees.

16. The method according to claim 13, wherein the solar panel is angled about only a single axis during tracking.

17. The method according to claim 1, further comprising determining the predetermined amount of days as a function of a latitude position of the solar panel.

18. The method according to claim 1, wherein the at least one angled position comprises an angle equal to a sum of a latitude coordinate degree of the solar panel plus 12 degrees.

* * * * *